United States Patent [19]

Sfredda

[11] 4,322,955
[45] Apr. 6, 1982

[54] FLEXIBLE COUPLING

[76] Inventor: Albert P. Sfredda, 2106 Iris Pl., Bethlehem, Pa. 18018

[21] Appl. No.: 149,757

[22] Filed: May 14, 1980

[51] Int. Cl.³ .............................. F16D 3/22; F16D 3/64
[52] U.S. Cl. .......................................... 64/16; 64/11 R
[58] Field of Search .................................. 64/16, 11 R

[56] References Cited

U.S. PATENT DOCUMENTS

| | | | |
|---|---|---|---|
| 709,992 | 9/1902 | Mather | 64/16 |
| 1,043,493 | 11/1912 | Whitworth | 64/16 |
| 1,520,336 | 12/1924 | Denzer | 64/16 |
| 1,815,639 | 7/1931 | Wilkin et al. | 64/11 |
| 3,919,860 | 11/1975 | Dolfsma | 64/11 |
| 4,034,575 | 7/1977 | Barth | 64/11 R |
| 4,095,485 | 6/1978 | Hiersig | 64/11 R |

Primary Examiner—Wendell E. Burns

[57] ABSTRACT

A flexible coupling having a rotatable drive and driven member. Each member has a pair of diametrically opposed lugs secured thereto. A floating member having four equally spaced peripheral grooves is disposed between the drive and driven member. Tilting elements contact each lug of the drive and driven members with two sides of each respective groove of the floating member.

4 Claims, 3 Drawing Figures

FLEXIBLE COUPLING

SUMMARY OF THE INVENTION

This invention relates to couplings that transmit rotary motion from a drive to a driven member and more particularly to the type that employs flexible members. Frictional contact, metal fatigue and backlash are the most common problems with couplings of this type, especially when large shaft misalignments are present.

Attempts at the use of rolling elements to reduce friction and wear between the rapid oscillating coupling members have not been successful due to the problems of roller fatigue and roller skidding caused by the effects of roller inertia. Couplings using flexible metal springs reduce these disadvantages, but the problems of metal fatigue prohibit the combined accommodation of axial displacements and large parallel shaft misalignments.

It is an object of my invention to overcome these problems by providing a flexible coupling that operates with little friction, is highly efficient, durable and accommodates the combination of axial displacements and large parallel shaft misalignments.

Another object of this invention is to provide a flexible coupling that operates without backlash.

The foregoing objects are accomplished by the use of tilting elements in a coupling to provide efficient torque-rigid movement between the drive and driven members.

These objects and advantages of the present invention will become more readily apparent from the following description and drawings:

DISCLOSURE OF THE EMBODIMENT

Figure 2:
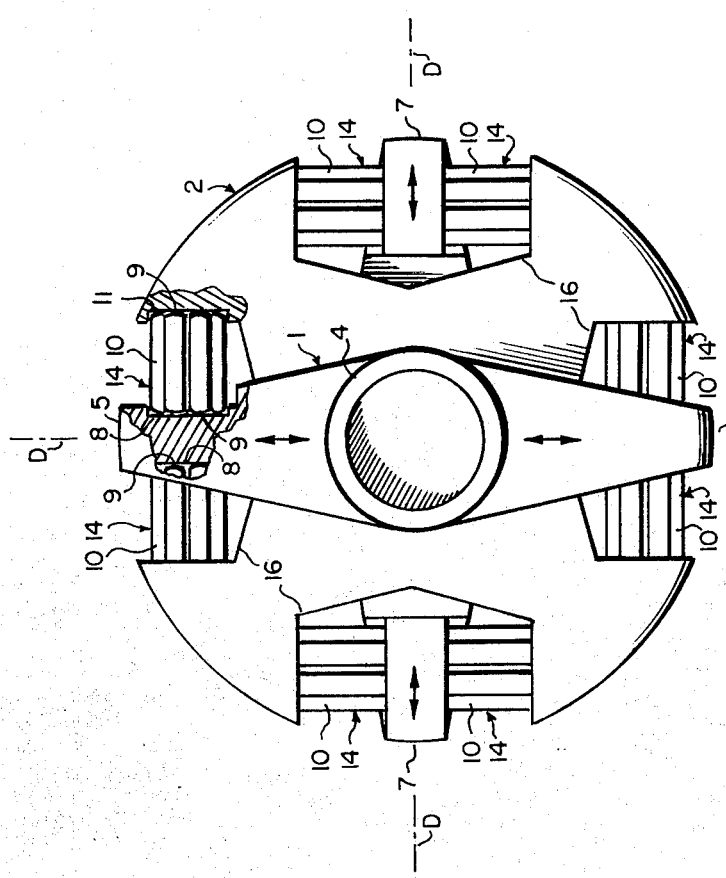
FIG. 2 is a side view of the flexible coupling.
Figure 1:
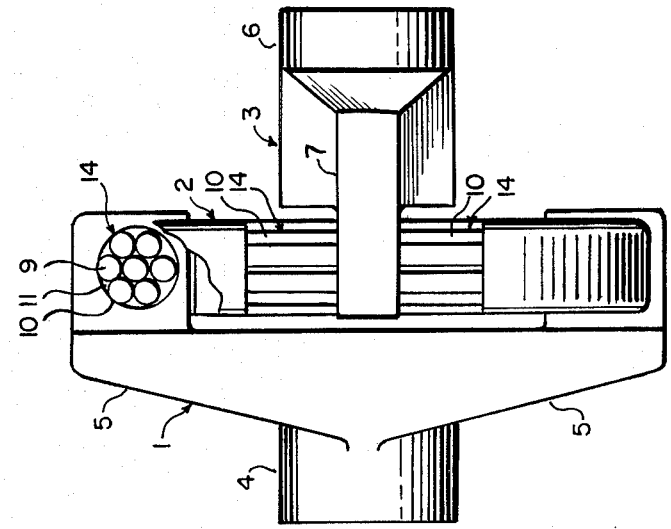
FIG. 1 is an end view of the flexible coupling.

Referring to FIGS. 1 and 2, drive member 1 basically comprises a shaft receiving sleeve 4 and two radially extending arms (or lugs) 5. The driven member 3 can be identical to drive member 1 and basically comprises a shaft receiving sleeve 6 with two radially extended arms (or lugs) 7. The arms 7 of driven member 3 are positioned at right angles relative to the arms of drive member 1. Floating member 2 is positioned between drive member 1 and driven member 3. On each arm 5,7 there are two flat bottom recesses 8. The flat bottoms of the recesses 8 are parallel to their respective arms' 5,7 diametrical center line D. These recesses contain the rounded ends 9 of pin shaped tilting elements 10. There are seven elements in each cluster 14. The opposing rounded ends 9 are contained by the flat bottom recesses 11 that are formed in the grooves 16 of the floating member 2. The flat bottoms of the recesses 11 are parallel to their respective grooves' 16 diametrical center line D. The tilting elements 10 have a radius of curvature that is equal to one-half their length. This curvature permits parallel and axial movement between the drive member 1 and floating member 2, also between the driven member 3 and floating member 2. The large radius of curvature of the tilting elements 10 will permit a relatively large tilt angle with very little pivotal creep or roll at the tilting elements' 10 contact points, resulting in virtually friction-free movement. The fact that there is very little lateral movement at the contact points of the tilting elements' 10, the diameter of the retaining recesses 8,11 need be only a few thousandths of an inch larger than the diameter of the tilting element cluster 14. Seven pins are shown in the cluster 14; however, any suitable number can be employed. The tilting elements 10 can be fitted tightly (preloaded) between their contacting surfaces (recesses 8,11) to prevent backlash.

In operation, rotation of the drive member 1 will transmit torque to the floating member 2 through the contacting pairs of tilting element clusters 14. In turn, floating member 2 will transmit torque to the driven member through the second pair of contacting tilting element clusters 14. Misalignments will be accommodated by the tilting of the tilting elements 10 and the shifting of the floating member 2. The arrows indicate the relative radial movement between the floating member 2 and the drive 1 and driven 3 members.

Figure 3:
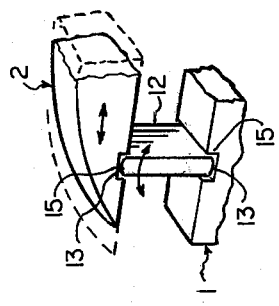
FIG. 3 is a perspective fragmentation view of another form of a tilting element.

FIG. 3 shows another form of a tilting element. This bar-shaped tilting element 12 has rounded ends 13 with a radius of curvature that is equal to one-half of the length of the element 12. Flat bottom grooves 15 retain the bar-shaped tilting element 12. One element is shown; however, several can be stacked in a larger groove. The curved arrow indicates the tilting motion of the tilting element 12. The straight arrow indicates the parallel movement of the floating member 2. This type of tilting element accommodates large parallel shaft misalignments.

There are many variations that may be practiced within the scope of this invention. As an example, arms 5,7 and grooves 16 locations can be reversed, whereby the drive and driven members will have two grooves 16 and the floating member would have four arms.

I claim:

1. A flexible coupling comprising: an axially rotatable drive member, an axially rotatable driven member, each said member having a pair of diametrically opposed lugs affixed thereto, two opposing sides of each said lug having flat portions that are parallel to the diametrical center line of said lugs and perpendicular to the axis of rotation, an axially rotatable floating member having a first pair of diametrically opposed grooves, a second pair of diametrically opposed grooves disposed generally 90 degrees relative to the first pair of grooves, each said groove having two opposed flat portions that are parallel to the grooves' respective diametrical center line and perpendicular to the axis of rotation, said floating member positioned between said drive and driven members in such a manner that the flat portions of each said lug of said driven member are generally centered in respective said grooves of the first pair of grooves, the flat portions of each said lug of said driven member are generally centered in respective said grooves of the second pair of opposing grooves, a plurality of elongated tilting elements, each said tilting element having rounded ends, at least one said tilting element disposed on each side of each said lug and being aligned perpendicular to the flat portions of said lugs, one said rounded end of each said tilting element contacting the respective said flat portion of the respective said lug, the opposite rounded end of each said tilting element contacting the respective said flat portion of the respective said grooves, retaining means for confining each said rounded end of said tilting element to the respective said flat portion of said lug and said groove.

2. A device as in claim 1, wherein said tilting element comprises: a pin having rounded ends, the radius of curvature of said rounded ends being one-half the length of said pin.

3. A device as in claim 1 wherein said tilting element comprises: a bar-shaped element having two opposing rounded ends, the radius of curvature of said rounded ends being one-half the length of said bar.

4. A flexible coupling comprising: a first axially rotatable member having shaft receiving means at its center and a pair of diametrically opposed extending arms affixed thereto, a second rotatable member axially aligned with said first member having shaft receiving means at its center and a pair of diametrically opposed radially extending arms affixed thereto, a floating member disposed between said first and second member for axial rotation therewith, said floating member having four equally spaced radially extending sections, at least one elongated member having rounded ends positioned on each side of the arms of the first member and contacting respective sides of the radially extending sections of the floating member, at least one elongated member having rounded ends positioned on each side of the arms of the second member and contacting respective sides of the radially extending sections of the floating member, said elongated members being positioned on a plane perpendicular to the axis of rotation and to the diametrical center line of said arms, recessed areas present in said radially extending sections and in said radially extending arms of said first and second members, the recessed areas terminating in a flat portion perpendicular to the respective elongated members and providing a contact surface for the rounded ends of the elongated members.

* * * * *